(12) United States Patent
Plonka et al.

(10) Patent No.: US 9,983,914 B2
(45) Date of Patent: May 29, 2018

(54) MEMORY CORRUPTION PROTECTION BY TRACING MEMORY

(71) Applicant: Mentor Graphics Corporation, Wilsonville, OR (US)

(72) Inventors: Grzegorz Plonka, Gliwice (PL); Rafal Struzyk, Gliwice (PL)

(73) Assignee: Mentor Graphics Corporation, Wilsonville, OR (US)

( * ) Notice: Subject to any disclaimer, the term of this patent is extended or adjusted under 35 U.S.C. 154(b) by 264 days.

(21) Appl. No.: 14/708,490

(22) Filed: May 11, 2015

(65) Prior Publication Data

US 2016/0335021 A1    Nov. 17, 2016

(51) Int. Cl.
*G06F 11/07*    (2006.01)

(52) U.S. Cl.
CPC ..................... *G06F 11/07* (2013.01)

(58) Field of Classification Search
None
See application file for complete search history.

(56) References Cited

U.S. PATENT DOCUMENTS

| 7,293,142 | B1 * | 11/2007 | Xu | G06F 11/3648 |
| | | | | 707/999.202 |
| 2001/0049770 | A1 * | 12/2001 | Cai | G06F 12/0848 |
| | | | | 711/129 |
| 2011/0072418 | A1 * | 3/2011 | Kalamegham | G06F 11/3636 |
| | | | | 717/128 |
| 2011/0231826 | A1 * | 9/2011 | Narasimhan | G06F 11/3636 |
| | | | | 717/128 |
| 2016/0147653 | A1 * | 5/2016 | Accapadi | G06F 11/3636 |
| | | | | 711/154 |

OTHER PUBLICATIONS

Microsoft Dev Center, Creating Guard Pages, Oct. 2011. https://msdn.microsoft.com/en-us/library/windows/desktop/aa366549(v=vs.85).aspx.*

* cited by examiner

*Primary Examiner* — Prasith Thammavong
*Assistant Examiner* — Edmund H Kwong
(74) *Attorney, Agent, or Firm* — Mentor Graphics Corporation

(57) ABSTRACT

This application discloses a computing system configured to request that an operating system implemented by the computing system allocate a virtual address space, which is designated for use by an application implemented by the computing system, to a memory verification tool implemented by the computing system. The computing system is configured to utilize the virtual address space to form a memory pool having multiple protectable slots available for allocation to the application. The computing system is further configured to intercept a memory allocation request issued by the application to the operating system of the computing system, and allocate at least one of the protectable slots in the memory pool to the application in response to the intercepted memory allocation request.

20 Claims, 7 Drawing Sheets

VIRTUAL MEMORY ADDRESS ALLOCATION

MEMORY CORRUPTION PROTECTION BY TRACING MEMORY

TECHNICAL FIELD

This application is generally related to memory verification and, more specifically, to memory corruption protection by tracing heap memory with a memory debugging tool.

BACKGROUND

One common memory management technique, called virtual memory, abstracts physical address space of a memory system into a virtual address space for use by applications executed by a processing system. For example, the processing system can generate the virtual memory addresses, map them to physical memory addresses in the memory system, and assign different, non-overlapping sets of the virtual memory addresses to different applications running on the processing system. The processing system, typically through a combination of hardware exceptions, hardware address translation, main memory, disk files, kernel software, or the like, can manage allocation and release of the virtual address space for the applications running on the processing system.

While the abstraction of physical memory into virtual memory can free applications from having to manage shared physical memory among themselves and allow the processing system to avoid overlap in physical address utilization by different applications running on the processing system, many applications as-written can utilize virtual memory improperly—causing memory corruption. Some of the common types of memory corruption include buffer overrun and utilization of invalid or destroyed objects. Buffer overrun can occur when a function in an application is allocated a block of virtual memory addresses by the computing system, commonly including one or more memory pages, and the application reads or writes to virtual memory addresses outside of the allocated block of virtual memory addresses. The utilization of invalid or destroyed objects can occur when a function in an application releases or frees a virtual memory address from allocation to the function, but the function attempts a memory access to the freed virtual memory address anyway, possibly reading or writing data corresponding to a different function in the application. The utilization of invalid or destroyed objects also can occur when a function in an application releases or frees a virtual memory address from allocation to the function even though the virtual memory address was already free from allocation, sometimes called a "double-free" memory corruption.

Since these types of memory corruption occur due to defects in the programming of the application, some application developers utilize memory verification tools, sometimes called memory debuggers, to analyze the operation of the applications in the processing system to determine whether they are written in a way that can cause memory corruption. While these memory debuggers can identify whether an application incurs some of the common types of memory corruption, they often consume a large amount of memory resources to do so. For example, in order to identify whether a function in the application attempt to access or free and already freed virtual memory address, the some memory debuggers will never actually release the allocation of the virtual memory address, but rather keep them as placeholders to detect possible actions indicative of memory corruption. By never releasing or freeing virtual memory addresses, the memory debuggers rapidly consume physical memory mapped to the virtual memory space, which, in absence of a memory corruption event, remains unused by the application. For smaller applications, memory systems may have a large enough physical memory to accommodate this particular verification scheme, but the memory debuggers can run out of physical memory when attempting to verify operation of larger applications.

SUMMARY

This application discloses a computing system configured to memory corruption protection by tracing memory. The computing system can request that an operating system implemented by the computing system allocate a virtual address space, which is designated for use by an application implemented by the computing system, to a memory verification tool implemented by the computing system. The computing system is configured to utilize the virtual address space to form a memory pool having multiple protectable slots available for allocation to the application. The computing system is further configured to intercept a memory allocation request issued by the application to the operating system of the computing system, and allocate at least one of the protectable slots in the memory pool to the application in response to the intercepted memory allocation request. Embodiments of memory corruption protection are described in greater detail below.

DETAILED DESCRIPTION

Illustrative Operating Environment

The execution of various applications may be implemented using computer-executable software instructions executed by one or more programmable computing devices. Because these embodiments of the invention may be implemented using software instructions, the components and operation of a generic programmable computer system on which various embodiments of the invention may be employed will first be described.

Figure 1:
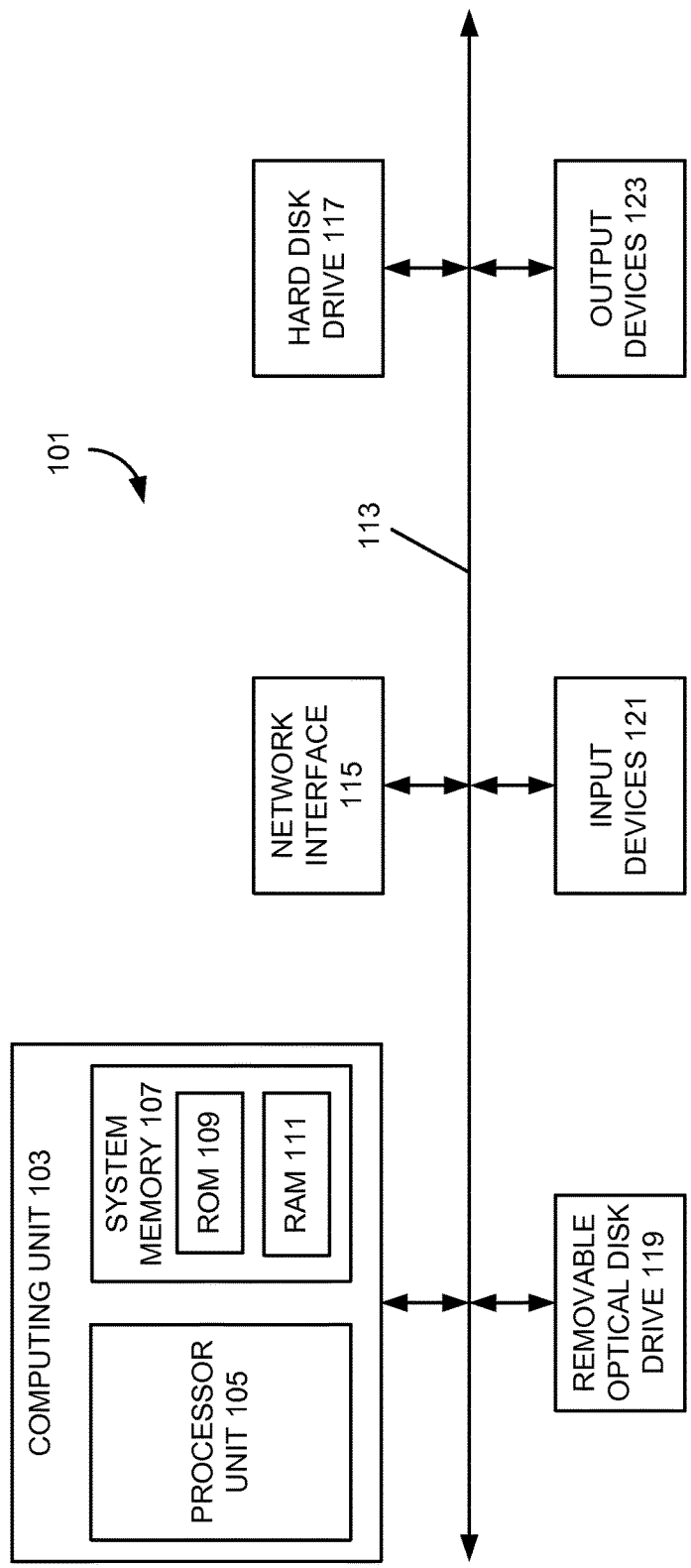
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
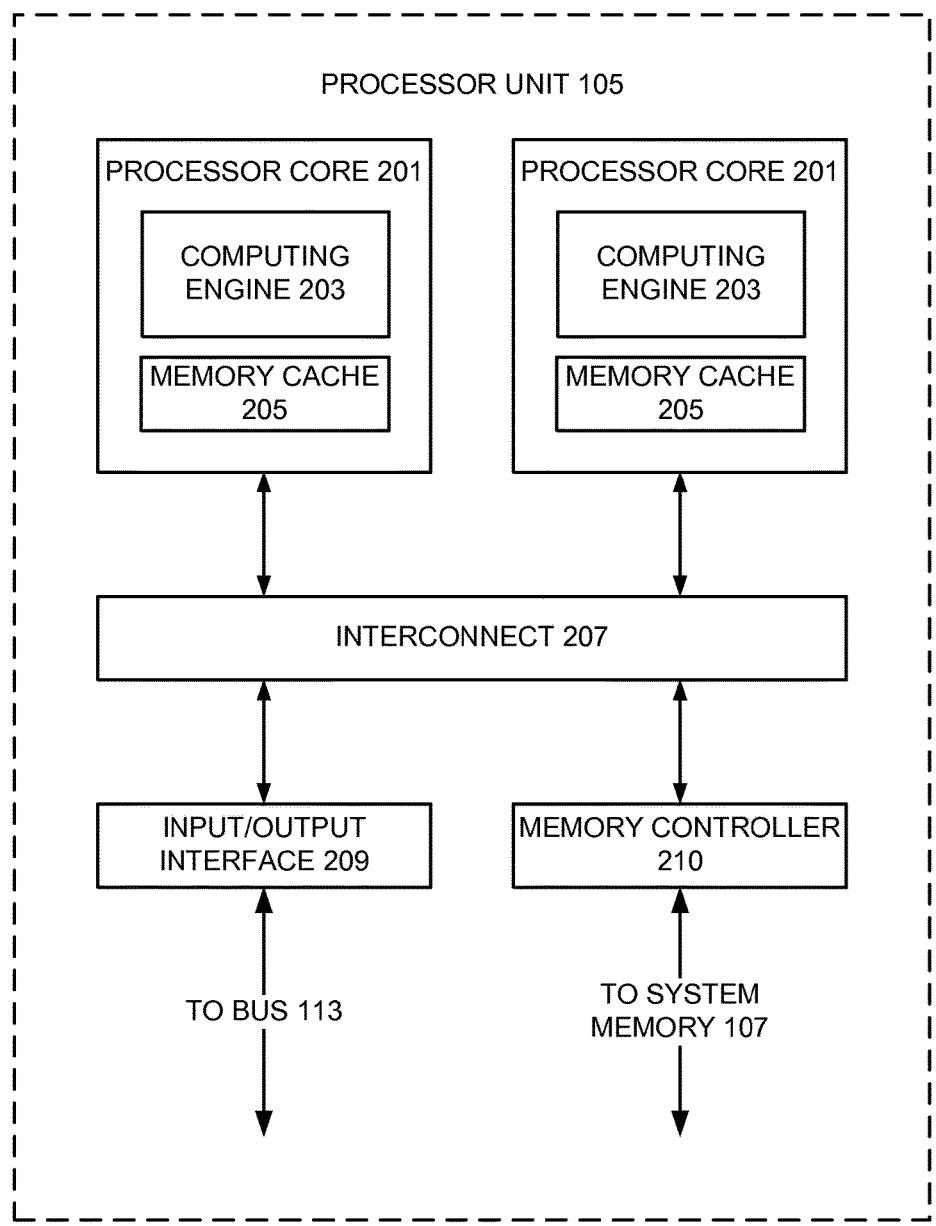

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Memory Verification Tool

Figure 3:
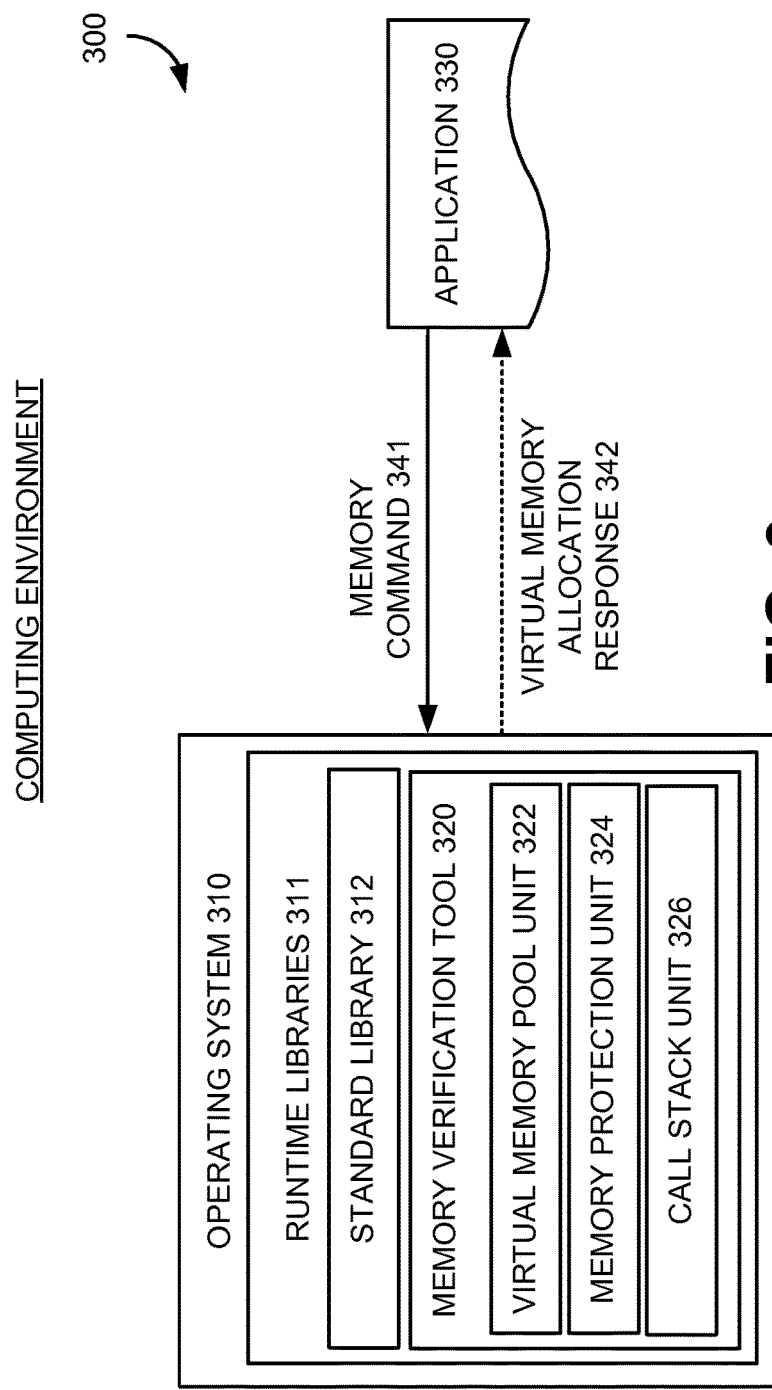
FIG. 3 illustrates an example computing system implementing a memory verification tool to debug memory corruption in an application according to various embodiments of the invention.

FIG. 3 illustrates an example computing system implementing a memory verification tool 320 to debug memory corruption in an application 330 according to various embodiments of the invention. Referring to FIG. 3, the computing system, such as the computing device or the computer 101 in FIG. 1, can implement an operating system 310 in a computing environment 300. The operating system 310, for example, with one or more kernels, can manage hardware and software resources of the computing system and provide common services for computer programs executed by one or more processors in the computing system. In some embodiments, the operating system 310 can be a Unix system or a Unix-like system, such as a GNU system or a Linux-based system.

The computing environment 300 can include an application 300 implemented by the computing system. In some embodiments, the application 330 can be coded in programming language, such as C, C++, Java, or the like, which can be compiled into a format executable by the computing system, such as an assembly language or a machine language, often called object code or machine code. The application 330 can request that the operating system 310 perform various services or functions for the application 330, such as memory allocation, mathematical functions, string manipulation, case conversion, date and time conversions, or the like.

The operating system 310 can include runtime libraries 311 having functions or processes that, when implemented by the operating system 310, can perform various services or functions for the computer programs, such as the application 330, threads of a computer program, or processes. The runtime libraries 311 can include at least one standard library 312. In some embodiments, the standard library 312 can be a standard C library having functions or processes capable of being called by the operating system 310, for example, in response to execution of the application 330 in the computing environment 300. In some embodiments, when the operating system 310 is a Unix system or a Unix-like system, such as a GNU system or a Linux-based system, the standard library 312 can be a GNU implementation of a Portable Operating System Interface (POSIX) standard runtime library for the C programming language, often called GNU C Library or glibc, which can provide system application programming interfaces (APIs) between programs or applications written in C and C-compatible programming languages and the operating system 310.

The glibc or standard C library can include functions or processes capable of allowing the operating system 310 to implement many common operations, such as memory management, mathematical functions, string manipulation, case conversion, date and time conversions, or the like. For example, the application 330 can issue a memory command 341 to the operating system 310, for example, requesting allocation of virtual memory addresses from a virtual memory space available for allocation to the application 330. In response to the memory command 341, the operating system 310 can identify a set of virtual memory addresses based on functions in the standard library 312 to allocate to the application 330, and send a virtual memory allocation response 342 indicating the identified set of virtual memory addresses has been allocated to the application 330.

Since the application 330 may include programming errors or "bugs" that could cause memory corruption, such as use of unallocated virtual memory address space, the computing system can load a memory verification tool 320, for example, into the operating system 310, to control allocation and de-allocation of virtual memory space for the application 330 and monitor activity of the application 330 for memory access events indicative of memory corruption. In some embodiments, the memory verification tool 320 can be pre-loaded as one of the runtime libraries 311, which can overlay the standard library 312 utilized by the operating system 310. For example, when the application 330 issues the memory command 341 to the operating system 310, for example, requesting allocation of virtual memory addresses from the virtual memory space available for allocation to the application 330, the operating system 310 can identify the set of virtual memory addresses to allocate to the application 330 based on functions in the memory verification tool 320, rather than the standard library 312.

When the operating system 310 is a Unix system or a Unix-like system, such as a GNU system or a Linux-based system, the memory verification tool 320 can be pre-loaded into the operating system 310 with a preload mechanism, such as a LD_PRELOAD command. The preload mechanism can identify a list of one or more user-specified Executable and Linkable Format (ELF) shared libraries, such as the memory verification tool 320, to be loaded into the operating system 310 before other shared libraries, such as the standard library 312, which can selectively override functions in the other shared libraries. The preload mechanism can search for the ELF shared libraries using the rules, for example, given under DESCRIPTION section of the preload mechanism.

The memory verification tool 320 can include a virtual memory pool unit 322 to generate at least one memory pool of virtual memory addresses that can be allocated by the memory verification tool 320 to the application 330 upon request. In some embodiments, the virtual memory pool unit 322 can request allocation of a portion of a virtual memory space that the operating system 310 has made available for allocation to the application 330, and utilize the allocated portion of the virtual memory space to generate the memory pool. In other words, rather than allocating virtual memory address space directly to the application 330, the virtual memory pool unit 322 acts as an intermediary, by pre-allocating the portion of the virtual memory address space and then selectively fulfilling memory allocation requests or memory commands 341 from the application 330 with virtual memory addresses in the memory pool. By pre-allocating the virtual memory addresses to the virtual memory pool unit 322, the virtual memory pool unit 322 can control and monitor allocation and de-allocation of those virtual memory addresses. In some embodiments, the virtual memory pool unit 322 can build the memory pool from virtual memory space previously allocated to the application 330 by the operating system 310. For example, when an application 330 requests release of virtual memory addresses back to the operating system 310, the virtual memory pool unit 322 can intercept the request and assign those virtual memory addresses to the memory pool. Embodiments of virtual memory address allocation and de-allocation by the memory verification tool 320 will be described below in greater detail.

The virtual memory pool unit 322 can control the allocation of physical memory, such as heap memory, that corresponds to the virtual memory addresses in the memory pool. In some embodiments, the virtual memory pool unit 322 can request the operating system 310 to not allocate physical memory to virtual memory addresses in the memory pool. The virtual memory pool unit 322 can have the operating system 310 allocate physical memory to correspond to a set of the virtual memory addresses, for example, when the virtual memory pool unit 322 allocates the set of the virtual memory addresses to the application 330. The virtual memory pool unit 322 also can have the operating system 310 de-allocate physical memory that corresponds to the set of the virtual memory addresses, for example, when the virtual memory pool unit 322 de-allocates the set of the virtual memory addresses from the application 330. By controlling the allocation and the de-allocation of physical memory to those virtual memory addresses allocated to and de-allocated from the application 330, the intermediate allocation of the virtual memory addresses to the memory verification tool 320 to form the memory pool can be accomplished without consuming a large amount of the available physical memory.

The memory verification tool 320 can include a memory protection unit 324 to set protections on the virtual memory address space in the memory pool, but not allocated to the application 330, which can help detect memory access that could cause memory corruption. These protections can allow the operating system 310 or underlying hardware in the computing system to identify when the application 330 attempts a memory access to a virtual memory address that is not allocated to the application 330, for example, triggering an exception that annunciates a detection of a memory access that could cause memory corruption. For example, the memory protection unit 324 can set the protections of the virtual memory address space by setting bits or states of one or more registers in a memory management unit in the computing system. Embodiments of protection setting by the memory verification tool 320 will be described below in greater detail.

The memory verification tool 320 can include a call stack unit 326 to record a call stack of functions called by the application 330 during execution. The call stack unit 326 also can record allocation and de-allocation operations performed by the virtual memory pool unit 322, for example, showing a history of virtual memory address allocation and de-allocation by the memory verification tool 320. In response to an exception, for example triggered by an attempted memory access associated with a protected virtual memory address, the call stack unit 326 can report the call stack of functions called by the application 330, and optionally the record of allocation and de-allocation operations performed by the virtual memory pool unit 322. This information can allow programmers to identify the programming error or "bug" in the application 330 that could cause memory corruption.

Figure 4A:
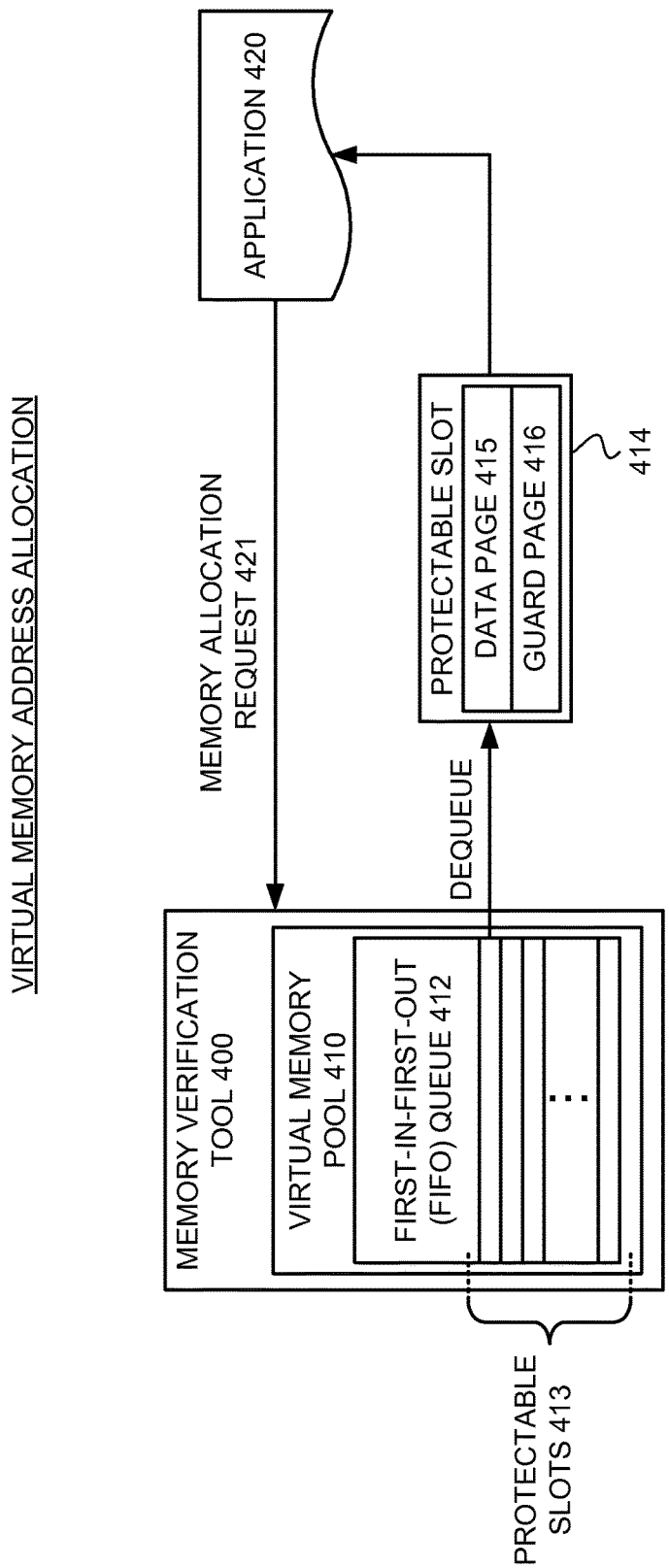
FIG. 4A illustrates an example virtual memory address allocation by a memory verification tool according to various embodiments of the invention.

FIG. 4A illustrates an example virtual memory address allocation by a memory verification tool 400 according to various embodiments of the invention. Referring to FIG. 4A, the memory verification tool 400 can include a virtual memory pool 410 including virtual memory address space pre-allocated to the memory verification tool 400. As discussed above, the virtual memory address space pre-allocated to the memory verification tool 400 can be a portion of the virtual memory address space capable of being allocated to an application 420 by an operating system.

The memory verification tool 400 can organize the virtual memory addresses in the virtual memory pool 410 into multiple protectable slots 413 each including one or more memory pages. Each memory page can include a different set of the virtual memory addresses. In some embodiments, the virtual memory pool 410 can implement a First-In-First-Out (FIFO) queue 412 with the protectable slots 413. As will be discussed below in greater detail, this FIFO queue 412 arrangement of the protectable slots 413 can allow the memory verification tool 400 to order allocation of the protectable slots 413 to the application 420, which can allow the memory verification tool 400 to monitor attempted memory access to unallocated or previously released virtual memory addresses in the virtual memory pool 410. Although FIG. 4A shows a FIFO organization of the virtual memory pool 410, in some embodiments, other organizations can be utilized, such as an organization that allows for near-FIFO organization, multiple different organizations for different sub-sets of the protectable slots 413, or the like.

The protectable slots 413 can include at least one data page that, when allocated to an application 420, can allow the application 420 to access physical memory associated with the virtual memory addresses corresponding to the at least one data page. The memory verification tool 400 can selectively set protections on the data pages in the protectable slots 413 based on whether the memory verification tool 400 has allocated the protectable slots 413 to the application 420. For example, when the memory verification tool 400 has a protectable slot 413 unallocated to the application 420, the memory verification tool 400 can set a protection on the data page in the protectable slot 413, which would trigger an exception by the computing system. When the memory verification tool 400 allocates the protectable slot 413 to the application 420, the memory verification tool 400 can remove the protection on the data page in the protectable slot 413, allowing the application 420 the ability to access physical memory corresponding to the virtual memory addresses associated with the data page in the protectable slot 413.

In some embodiments, one or more of the protectable slots 413 also can include at least one guard page that, when allocated to an application 420, can remain protected from memory access by the application 420 and utilized by the memory verification tool 400 to detect buffer overrun of the at least one data page. For example, a guard page in one of the protectable slots 413 can have one or more virtual memory addresses that fall sequentially before or after those of the data page(s) in the protectable slot 413, and thus would trigger an exception by the computing system if the application 420 accessed the virtual memory addresses sequentially before or after the data page in the protectable slot 413. Although a guard page can include one or more pages of virtual memory addresses, in some embodiments, a guard page can include a set of one or more virtual memory addresses that is larger or smaller than a page of virtual memory addresses.

The application 420 can request allocation of virtual memory address space, for example, by issuing a memory allocation request 421 to an operating system. The memory verification tool 400 can intercept the memory allocation request 421, which would normally be served by functions or process from a standard library utilized by the operating system. The memory verification tool 400, in response to the memory allocation request 421, can allocate a protectable slot 414 to the application 420. In some embodiments, the memory verification tool 400 can de-queue the protectable slot 414 from a top of the FIFO queue 412 and provide the protectable slot 414 to the application 420. The allocation of the protectable slot 414 can include the memory verification tool 400 prompting the operating system to allocate physical memory address space to correspond to virtual memory address space in a data page 415 of the protectable slot 414, and removing the protections to the data page 415, for example, by changing the state of bits in a memory management unit of the computing system. The memory verification tool 400 can retain the protections on the guard page 416 and not request the operating system to allocate physical address space to the guard page 416, which can detect attempted memory access by the application 420 to the virtual address space associated with the guard page 416.

In some embodiments, the memory verification tool 400 can implement a size limitation on virtual memory allocation from the virtual memory pool 410. For example, the memory verification tool 400, in response to intercepting the memory allocation request 421, can identify a size of the virtual memory space requested. If the size of the requested virtual memory space is below or equal to a preset threshold size, for example, number of data pages, the memory verification tool 400 can allocate one or more of the protectable slots 413 to the application 420 to fulfill the memory allocation request 421. If, however, the size of the requested virtual memory space is above a preset threshold size, the memory verification tool 400 can request the virtual memory address space via the operating system rather than the virtual memory pool 410, or the memory verification tool 400 can pass the intercepted memory allocation request 421 to the operating system so that the operating system can fulfill the request for virtual memory address space.

Figure 4B:
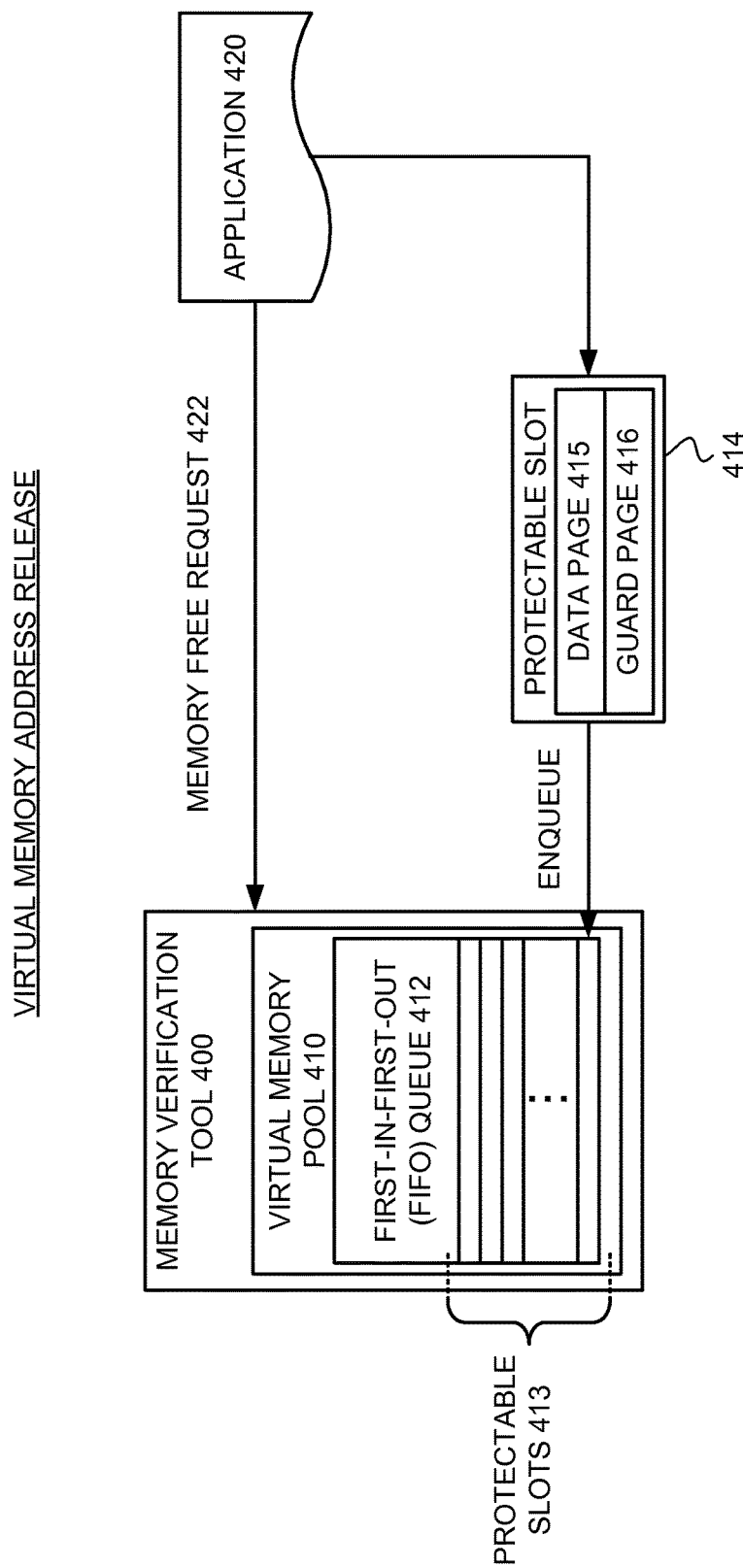
FIG. 4B illustrates an example virtual memory address release by a memory verification tool according to various embodiments of the invention.

FIG. 4B illustrates an example virtual memory address release by a memory verification tool according to various embodiments of the invention. Referring to FIG. 4B, the application 420 can request de-allocation or release of virtual memory address space, for example, by issuing a memory free request 422 to an operating system. The memory verification tool 400 can intercept the memory free request 422, which would normally be served by functions or process from a standard library utilized by the operating system.

The memory verification tool 400, in response to the memory free request 422, can de-allocate the protectable slot 414 from the application 420. In some embodiments, the memory verification tool 400 can en-queue the protectable slot 414 to the bottom of the FIFO queue 412. The de-allocation of the protectable slot 414 can include the memory verification tool 400 prompting the operating system to de-allocate or release physical memory address space corresponding to virtual memory address space in the data page 415 of the protectable slot 414, and setting the protections to the data page 415, for example, by changing the state of bits in a memory management unit of the computing system. The protections set to both the data page 415 and the guard page 416 can detect attempted memory access by the application 420 to the virtual address space associated with the data page 415 or the guard page 416.

By en-queuing the protectable slot 414 at the bottom of the FIFO queue and setting a protection for the protectable slot 414, the memory verification tool 400 can detect attempted memory access by the application 420 to the virtual address space associated with the protectable slot 414, while still allowing the protectable slot 414 to be re-allocated back to the application 420 in the future. This technique can allow the memory verification tool 400 to effectively gauge whether the application 420 includes a "bug" that attempts to access a previously-released virtual address without having to indefinitely lock-up both virtual memory address space and its corresponding physical memory address space.

Figure 5:
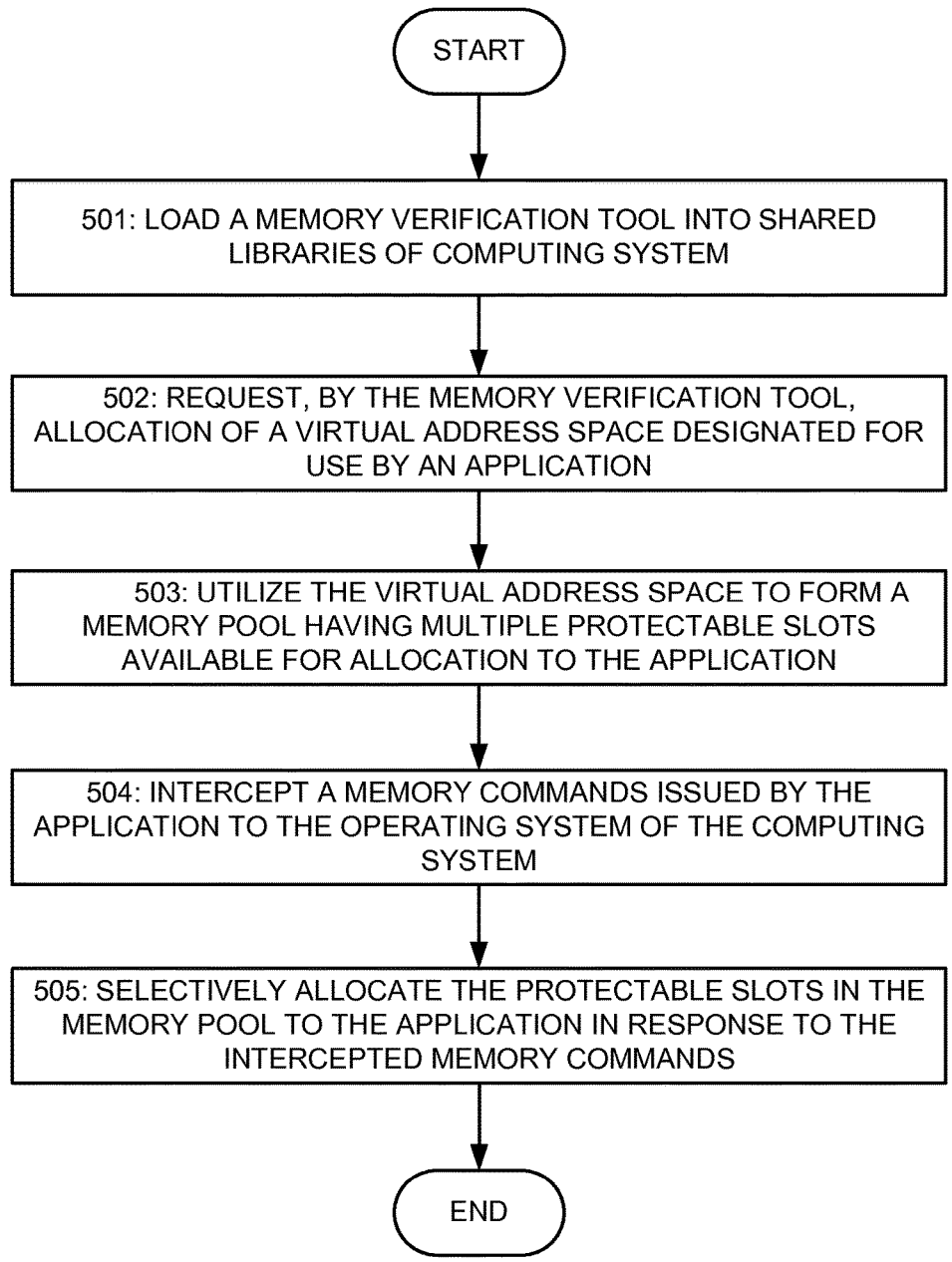
FIG. 5 illustrates a flowchart showing an example process for implementing a memory verification tool in a computing system according to various examples of the invention.

FIG. 5 illustrates a flowchart showing an example process for implementing a memory verification tool in a computing system according to various examples of the invention. Referring to FIG. 5, in a block 501, a computing system can load a memory verification tool into shared libraries of the computing system. In some embodiments, when an operating system of the computing system is a Unix system or a Unix-like system, such as a GNU system or a Linux-based system, the memory verification tool can be pre-loaded into the operating system with a preload mechanism, such as a LD_PRELOAD command. The preload mechanism can identify a list of one or more user-specified Executable and Linkable Format (ELF) shared libraries, such as the memory verification tool, to be loaded into the operating system before other shared libraries, such as the standard library, which can selectively override functions in the other shared libraries. The preload mechanism can search for the ELF shared libraries using the rules, for example, given under DESCRIPTION section of the preload mechanism.

In a block 502, the memory verification tool implemented by the computing system can request allocation of a virtual address space designated for use by an application, and, in a block 503, the memory verification tool implemented by the computing system can utilize the virtual address space to form a memory pool having multiple protectable slots available for allocation to the application. This pre-allocated virtual memory address space in the memory pool can be segmented into different memory pages, each of which including a different set of the virtual memory addresses. In some embodiments, the virtual memory pool can implement a First-In-First-Out (FIFO) queue with the protectable slots to order allocation of the protectable slots to the application.

In a block 504, the memory verification tool implemented by the computing system can intercept a memory commands issued by the application to the operating system of the computing system. The operating system would normally serve the memory commands with functions or process from a standard library utilized by the operating system. Since the operating system was pre-loaded with the memory verification tool in block 501, however, the memory verification tool can override the standard library functionality and implement functionality of the memory verification tool.

In a block 505, the memory verification tool implemented by the computing system can selectively allocate the protectable slots in the memory pool to the application in response to the intercepted memory commands. This selective allocation can include allocating and de-allocating protectable slots of including virtual memory addresses to the application. In some embodiments, the selective allocation can be based, at least in part, on the size of the virtual memory address space requested by the application. For example, the memory verification tool can allocate protective slots to the application from the memory pool when they are below a preset threshold size, and have the operating system dynamically allocate virtual memory address space for those other-sized requests.

Figure 6:
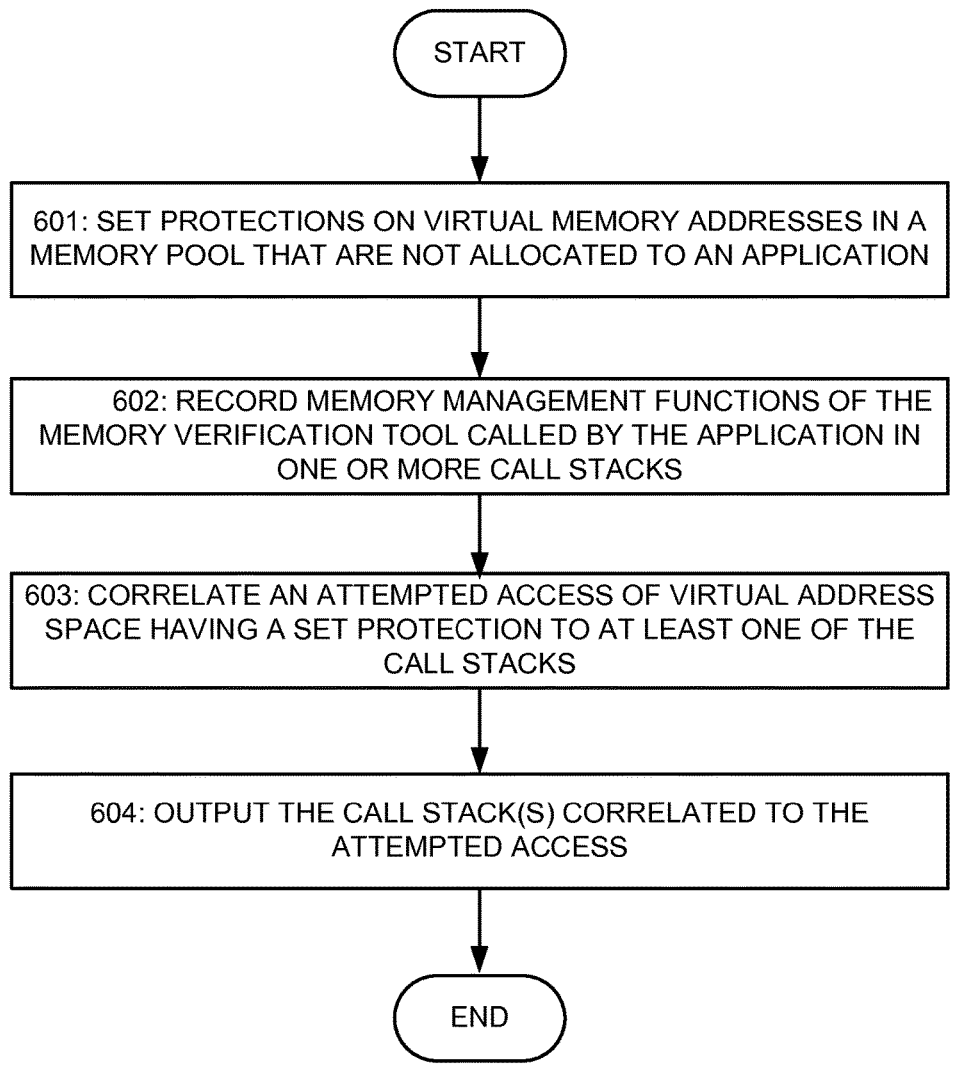
FIG. 6 illustrates a flowchart showing an example process for detecting memory corruption in an application with a memory verification tool according to various examples of the invention.

FIG. 6 illustrates a flowchart showing an example process for detecting memory corruption in an application with a memory verification tool according to various examples of the invention. Referring to FIG. 6, in a block 601, a memory verification tool implemented by a computing system can set protections on virtual memory addresses in a memory pool that are not allocated to an application. In some embodiments, the memory verification tool can set the protections of the virtual memory addressees by setting bits or states of one or more registers in a memory management unit in the computing system.

In a block 602, the memory verification tool implemented by the computing system can record memory management functions of the memory verification tool called by the application in one or more call stacks. For example, the memory verification tool can record a call stack of functions called by the application during execution. The memory verification tool also can record allocation and de-allocation operations, for example, showing a history of virtual memory address allocation and de-allocation by the memory verification tool.

In a block 603, the memory verification tool implemented by the computing system can correlate an attempted access of virtual address space having a set protection to at least one of the call stacks. When the application attempts access to the virtual address space having a set protection, in some embodiments, the memory management unit of the computing system can issue an exception. The memory verification tool, in response to the exception, can correlate the virtual address space or memory page that the application attempted to access with one or more of the call stacks and memory management history. In a block 604, the memory verification tool implemented by the computing system can output the call stack(s) correlated to the attempted access.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to certain processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    requesting, by a memory verification tool implemented by a computing system, that an operating system implemented by the computing system allocate a virtual address space to the memory verification tool, wherein the virtual address space is designated for use by an application implemented by the computing system;
    utilizing, by the memory verification tool implemented by the computing system, the virtual address space to form a memory pool having multiple protectable slots available for allocation to the application;
    intercepting, by the memory verification tool implemented by the computing system, a memory allocation request issued by the application to the operating system of the computing system; and
    allocating, by the memory verification tool implemented by the computing system, at least one of the protectable slots in the memory pool to the application in response to the intercepted memory allocation request.

2. The method of claim 1, further comprising setting, by the memory verification tool implemented by the computing system, memory access protection on unallocated protectable slots in the memory pool, wherein the memory access protection is configured to cause the computing system to trigger an exception in response to a memory access by the application to the unallocated protectable slots in the memory pool.

3. The method of claim 1, wherein the memory pool arranges the protectable slots in a first-in-first-out format for allocation to the application.

4. The method of claim 1, further comprising:
    intercepting, by the memory verification tool implemented by the computing system, a memory de-allocation request issued by the application to the operating system of the computing system; and
    returning, by the memory verification tool implemented by the computing system, the at least one of the protectable slots back to the memory pool controlled by the memory verification tool in response to the intercepted memory de-allocation request.

5. The method of claim 4, wherein de-allocating the at least one of the protectable slots in the memory pool from the application further comprises releasing addresses in a physical memory of the computing system associated with the at least one of the protectable slots.

6. The method of claim 1, wherein each protectable slot, when allocated to the application implemented by the computing system, includes at least one data page corresponding to addresses in a physical memory of the computing system that are capable of being accessed by the application, and includes at least one guard page that does not correspond to addresses in the physical memory.

7. The method of claim 1, wherein allocating at least one of the protectable slots in the memory pool to the application further comprises requesting the computing system allocate addresses in a physical memory of the computing system associated with the at least one of the protectable slots.

8. A system comprising:
a memory system configured to store computer-executable instructions; and
a computing system, in response to execution of the computer-executable instructions, is configured to:
request that an operating system implemented by the computing system allocate a virtual address space to a memory verification tool implemented by the computing system, wherein the virtual address space is designated for use by an application implemented by the computing system;
utilize, by the memory verification tool, the virtual address space to form a memory pool having multiple protectable slots available for allocation to the application;
intercept, by the memory verification tool, a memory allocation request issued by the application to the operating system of the computing system; and
allocate, by the memory verification tool, at least one of the protectable slots in the memory pool to the application in response to the intercepted memory allocation request.

9. The system of claim 8, wherein the computing system, in response to execution of the computer-executable instructions, is further configured to set memory access protection on unallocated protectable slots in the memory pool, wherein the memory access protection is configured to cause the computing system to trigger an exception in response to a memory access by the application to the unallocated protectable slots in the memory pool.

10. The system of claim 8, wherein the memory pool arranges the protectable slots in a first-in-first-out format for allocation to the application.

11. The system of claim 8, wherein the computing system, in response to execution of the computer-executable instructions, is further configured to:
intercept a memory de-allocation request issued by the application to the operating system of the computing system; and
return the at least one of the protectable slots back to the memory pool controlled by the memory verification tool in response to the intercepted memory de-allocation request.

12. The system of claim 11, wherein returning the at least one of the protectable slots back to the memory pool further comprises releasing addresses in a physical memory associated with the at least one of the protectable slots.

13. The system of claim 8, wherein each protectable slot, when allocated to the application implemented by the computing system, includes at least one data page corresponding to addresses in a physical memory of the computing system that are capable of being accessed by the application, and includes at least one guard page that does not correspond to addresses in the physical memory.

14. An apparatus comprising at least one computer-readable memory device storing instructions configured to cause one or more processing devices to perform operations comprising:
requesting that an operating system implemented by the one or more processing devices allocate a virtual address space to a memory verification tool implemented by the one or more processing devices, wherein the virtual address space is designated for use by an application implemented by the computing system;
utilizing, by the memory verification tool, the virtual address space to form a memory pool having multiple protectable slots available for allocation to the application;
intercepting, by the memory verification tool, a memory allocation request issued by the application to the operating system of the one or more processing devices; and
allocating, by the memory verification tool, at least one of the protectable slots in the memory pool to the application in response to the intercepted memory allocation request.

15. The apparatus of claim 14, wherein the instructions are configured to cause the one or more processing devices to perform operations further comprising setting memory access protection on unallocated protectable slots in the memory pool, and wherein the memory access protection is configured to cause the one or more processing devices to trigger an exception in response to a memory access by the application to the unallocated protectable slots in the memory pool.

16. The apparatus of claim 14, wherein the memory pool arranges the protectable slots in a first-in-first-out format for allocation to the application.

17. The apparatus of claim 14, wherein the instructions are configured to cause the one or more processing devices to perform operations further comprising:
intercepting, by the memory verification tool implemented by the computing system, a memory de-allocation request issued by the application to the operating system of the computing system; and
returning, by the memory verification tool implemented by the computing system, the at least one of the protectable slots back to the memory pool controlled by the memory verification tool in response to the intercepted memory de-allocation request.

18. The apparatus of claim 17, wherein returning the at least one of the protectable slots back to the memory pool further comprises releasing addresses in a physical memory associated with the at least one of the protectable slots.

19. The apparatus of claim 14, wherein each protectable slot, when allocated to the application implemented by the processing devices, includes at least one data page corresponding to addresses in a physical memory that are capable of being accessed by the application, and includes at least one guard page that does not correspond to addresses in the physical memory.

20. The apparatus of claim 14, further comprising:
intercepting another memory allocation request issued by the application to the operating system of the one or more processing devices;
determining a size of virtual address space requested in the memory allocation request exceeds a preset threshold; and
allocating virtual memory addresses from a location other than the memory pool to the application in response to the intercepted memory allocation request.

* * * * *